United States Patent
Merrill

(10) Patent No.: US 6,246,043 B1
(45) Date of Patent: Jun. 12, 2001

(54) METHOD AND APPARATUS FOR BIASING A CMOS ACTIVE PIXEL SENSOR ABOVE THE NOMINAL VOLTAGE MAXIMUMS FOR AN IC PROCESS

(75) Inventor: Richard B. Merrill, Woodside, CA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

(21) Appl. No.: 09/158,758

(22) Filed: Sep. 22, 1998

(51) Int. Cl.$^7$ .............................. H04N 3/14; H01L 31/062
(52) U.S. Cl. ........................................ 250/208.1; 348/308
(58) Field of Search ........................... 250/208.1, 208.2, 250/214 R, 214.1; 257/290, 291, 292, 293, 431; 348/308, 307, 302, 300, 301, 294, 295

(56) References Cited

U.S. PATENT DOCUMENTS

| | | | |
|---|---|---|---|
| 3,866,067 | 2/1975 | Amelio | 307/311 |
| 3,934,161 | 1/1976 | Caywood | 307/311 |
| 3,988,619 | 10/1976 | Malaviya et al. | 307/311 |
| 4,363,963 | 12/1982 | Ando | 250/211 |
| 4,499,529 | 2/1985 | Figueroa | 362/283 |
| 4,573,077 | 2/1986 | Imai | 358/212 |
| 4,626,915 | 12/1986 | Takatsu | 358/213 |
| 4,654,714 | 3/1987 | Hurst, Jr. et al. | 358/213 |
| 4,704,633 | 11/1987 | Matsumoto | 358/213.27 |
| 4,734,776 | 3/1988 | Wang et al. | 358/213.31 |
| 4,742,238 | 5/1988 | Sato | 250/578 |
| 4,809,075 | 2/1989 | Akimoto et al. | 358/213.18 |
| 4,839,735 | 6/1989 | Kyomasu et al. | 358/213.31 |
| 4,843,474 | 6/1989 | Suzuki | 358/213.19 |
| 4,875,091 | 10/1989 | Yamada et al. | 358/42 |
| 4,901,129 | 2/1990 | Hynecek | 357/30 |
| 4,908,651 | 3/1990 | Fujino et al. | 354/434 |
| 4,942,473 | 7/1990 | Zeevi et al. | 358/213.26 |
| 5,014,107 | 5/1991 | Vora | 357/44 |
| 5,021,853 | 6/1991 | Mistry | 357/23.13 |
| 5,055,418 | 10/1991 | Vora | 437/31 |
| 5,117,292 | 5/1992 | Matsunaga | 358/213.19 |
| 5,161,024 | 11/1992 | Oishi | 358/213.24 |
| 5,227,887 | 7/1993 | Dohi et al. | 358/213.27 |
| 5,276,521 | 1/1994 | Mori | 358/213.31 |
| 5,317,174 | 5/1994 | Hynecek | 257/222 |
| 5,335,015 | 8/1994 | Cooper et al. | 348/302 |
| 5,341,008 | 8/1994 | Hynecek | 257/231 |
| 5,396,289 | 3/1995 | Nakamura | 348/294 |
| 5,414,464 | 5/1995 | Sasaki | 348/222 |

(List continued on next page.)

FOREIGN PATENT DOCUMENTS 777379 6/1997 (EP) .............................. H04N/3/15

OTHER PUBLICATIONS

Chye Huat Aw, et al. "A 128×128–Pixel Standard CMOS Image Sensor with Electronic Shutter" IEEE International Solid State Circuits Conference vol. 39 pp. 180–181, 440 Feb. 1996.

(List continued on next page.)

Primary Examiner—John R. Lee
(74) Attorney, Agent, or Firm—Sierra Patent Group, Ltd.

(57) ABSTRACT

An active pixel sensor is operated with voltages that exceed the nominal operating voltages for a particular integrated circuit process. Voltages that exceed the nominal operating voltages are employed during the reset, integration and readout periods in the operating cycle of the active pixel sensor. The lower limit of the voltage representing the capture of photocharge in the active pixel sensor is fixed by setting the voltage applied to the gate of a reset transistor in the active pixel sensor to a level during integration which prevents the voltage across the dielectric of a transfer transistor from exceeding a preselected value. Read disturb caused by impact ionization current from a readout transistor to a storage node is reduced by lowering the voltage applied to the drain of a readout transistor to reduce the Vds of the readout transistor at the start of a readout period.

12 Claims, 5 Drawing Sheets

U.S. PATENT DOCUMENTS

| | | | |
|---|---|---|---|
| 5,414,683 | 5/1995 | Tani | 369/47 |
| 5,424,223 | 6/1995 | Hynecek | 437/3 |
| 5,428,390 | 6/1995 | Cooper et al. | 348/240 |
| 5,434,620 | 7/1995 | Higuchi et al. | 348/308 |
| 5,471,245 | 11/1995 | Cooper et al. | 348/302 |
| 5,541,402 | 7/1996 | Acklund et al. | 250/208.1 |
| 5,541,654 | 7/1996 | Roberts | 348/301 |
| 5,547,881 | 8/1996 | Wang et al. | 437/24 |
| 5,566,044 * | 10/1996 | Bergemont et al. | 361/321.1 |
| 5,572,074 | 11/1996 | Standley | 307/117 |
| 5,576,763 | 11/1996 | Ackland et al. | 348/308 |
| 5,589,423 | 12/1996 | White et al. | 437/228 |
| 5,625,210 | 4/1997 | Lee et al. | 257/292 |
| 5,631,704 | 5/1997 | Dickinson et al. | 348/308 |
| 5,705,441 | 1/1998 | Wang et al. | 438/384 |
| 5,712,682 | 1/1998 | Hannah | 348/255 |
| 5,739,562 | 4/1998 | Ackland et al. | 257/291 |
| 5,892,541 * | 4/1999 | Merrill | 348/302 |
| 5,900,623 * | 5/1999 | Tsang et al. | 250/208.1 |
| 6,008,486 * | 12/1999 | Stam et al. | 250/208.1 |
| 6,018,365 * | 1/2000 | Merrill | 348/302 |
| 6,069,377 * | 5/2000 | Prentice et al. | 257/292 |
| 6,080,601 * | 6/2000 | Bergemont et al. | 438/57 |
| 6,093,924 * | 7/2000 | Afghahi | 250/208.1 |
| 6,097,022 * | 8/2000 | Merrill et al. | 250/208.1 |
| 6,115,065 * | 9/2000 | Yadid-Pecht et al. | 348/308 |

OTHER PUBLICATIONS

Abbas El Garmal, et al. "Modeling and Estimation of FPN Components in CMOS Image Sensors" Information Systems Laboratory, Stanford University pp. 1–10 1987.

Alex Dickinson, et al. "TP 13.5: A 256×256 CMOS Active Pixel Image Sensor with Motion Detection" IEEE International Solid–State Circuits Conference pp. 226–227 1995.

Andrew J. Blanksby, et al. "Noise Performance of a color CMOS Photogate Image Sensor" IEEEE pp. 205–208 1997.

Author Unknown, "Tittle Unknown" IEDM pp. 202–204 1997.

Bernward Rossler "Electrically Erasable and Reprogrammable Read–Only Memory Using the n–Channel SIMOS One–Transistor Cell" IEEE Transactions on Electron Devices vol. ED–24, No. 5 pp. 606–610 May 1977.

Carver A. Mead, et al. "Scanners for Visualizing Activity of Analog VLSI Circuitry" California Institute of Technology Computation and Neural Systems Program pp. 1–29 Jul. 5, 1991.

Eric R. Fossum "Active Pixel Sensors: Are CCD's Dinosaurs?" SPIE vol. 1900 pp. 2–14.

Hon–Sum Philip Wong, et al. CMOS Active Pixel Image Sensors Fabricated Using a 1.8–V, 0.25–um CMOS Technology pp. 889–894 IEEE Transactions on Electron Devices vol. 45 No. 4 Apr. 1998.

Hon–Sum Philip Wong "CMOS Image Sensors–Recent Advances and Device Scaling Considerations" IEEE pp. 201–204 1997.

Orly Yadid–Pecht, et al. "A Random Access Photodiode Array for Intelligent Image Capture" IEEE Transactions on Electron Devices, vol. 38 No. 8 pp. 1772–1780 Aug. 1991.

R. Daniel McGrath, et al. "FA 11.2: Current–Mediated, Current–Reset 768×512 Active Pixel Sensor Array" IEEE/Slide Supplement pp. 182–183 & 138–139.

R. Panicacci, et al. "1/4–Inch CMOS Active Pixel Sensor with Smart On–Chip Functions and Full Digital Interface" Hot Chips IX pp. 41–54 Aug. 25–26, 1997.

S. Decker et, al. "A 256×256 CMOS Imaging Array with Wide Dynamic Range Pixels and Column–Parallel Digital Output" IEEE International Solid–State Circuits Conference pp. 176–177 1998.

S.M. SZE "Physics of Semiconductor Devices" Wiley––Interscience pp. 526–533 1969.

Stephen John Decker "A Wide Dynamic Range CMOS Imager With Parallel On–Chip Analog–to–Digital Conversion" pp. 1–205 1997.

Sunetra K. Mendis et, al. "A 128×128 CMOS Active Pixel Image Sensor for Highly Integrated Imaging Systems" IEEE pp. 583–586 1993.

T. Delbruck et, al "Analog VLSI Phototransduction by continuous–time, adaptive, logarithmic photoreceptor circuits" California Institute of Technology Computation and Neural Systems Program CNS Memo No. 30 Apr. 2, 1996 pp: 1–24.

Tobi Delbruck, et al. "Analog VLSI Adaptive, Logarithmic, Wide–Dynamic–Range Photoreceptor" ISCAS '94 Proceedings of the Int'l Symposium on Circuits and Systems IEEE London, May 1994.

Tatsuo Nomoto, et al. "FA 11.4: A 4M–Pixel Image Sensor with Block and step Access Capability" IEEE International pp. 186–187 Plus Four Additional Slides 1997.

Yoshiaki Hagiwara, Member, IEEE "High–Density and High–Quality Frame Transfer CCD Imager with Very Low Smear, Low Dark Current, and Very High Blue Sensitivity" IEEE Transactions on Electron Devices, vol. 43 No. 12 pp.2122–2130 Dec. 1996.

* cited by examiner

METHOD AND APPARATUS FOR BIASING A CMOS ACTIVE PIXEL SENSOR ABOVE THE NOMINAL VOLTAGE MAXIMUMS FOR AN IC PROCESS

BACKGROUND OF THE INVENTION

1. Field of the Invention

The present invention relates to CMOS active pixel sensors. More particularly, the present invention relates to biasing a CMOS active pixel sensor at voltages that exceed the nominal voltage maximums of the CMOS active pixel sensor to maximize the dynamic range in the CMOS active pixel sensor. Further, the present invention relates to biasing to reduce read disturb resulting from impact ionization current phenomenon in the CMOS active pixel sensor.

2. The Related Art

It can be readily observed by those of ordinary skill in the art that the size of the components and interconnect between components in integrated circuits have steadily decreased to permit a greater number of circuits to be formed on a single piece of silicon. As the process technologies shrink the size of the components and interconnect in an integrated circuit, a corresponding decrease in the nominal operating voltages of the components in integrated circuits have also decreased. Unfortunately, the shrinking of the process technology and the corresponding nominal operating voltages of the components in the integrated circuit are not directly scalable in some integrated circuit applications in the sense that the integrated circuit will not operate as desired for the nominal voltages that are typically indicated for the process technology by which the integrated circuit is implemented.

For example, a known CMOS active pixel sensor 10 is depicted in FIG. 1. The active pixel sensor 10 is fabricated according to a 0.5 um process which provides for a nominal operating voltage of 5.0 volts. In active pixel sensor 10, a photodiode 12 has an anode connected to ground and a cathode connected to the source of N-Channel MOS reset transistor 14. The drain of N-Channel MOS reset transistor 14 is connected to a Vref of greater than 3.5 volts and the gate of N-Channel MOS reset transistor 14 is connected to a RESET line.

The cathode of photodiode 12 is also connected to a first source/drain of N-channel MOS transfer transistor 16. A second source/drain of N-Channel MOS transfer transistor 16 is connected to a first terminal of a storage element 18 and also to the gate of N-channel MOS readout transistor 20. A second terminal of the storage element 18 is connected to a reference potential shown as ground. The gate of N-Channel MOS transfer transistor 16 is connected to a TRANSFER line. The connection of the second source/drain of N-Channel MOS transfer transistor 16 to the first terminal of storage element 18 and also to the gate of N-channel MOS transistor 20 forms a storage node 22.

The drain of N-channel MOS readout transistor 20 is connected to Vcc at greater than about 3.5 volts, and the source of N-channel MOS readout transistor 20 is connected to the drain of N-channel MOS row select transistor 24. The gate of N-channel MOS row select transistor 20 is connected to a ROW SELECT line, and the source of N-channel MOS row select transistor 24 is connected to a column output line. The drain of an N-channel MOS column bias transistor 26 is connected to the column output line, and the source of N-channel MOS column bias transistor 26 is connected to reference potential shown as ground. The gate of N-channel MOS column bias transistor 26 is connected to a COLUMN BIAS line.

FIG. 2 illustrates a timing diagram of the RESET, TRANSFER, and ROW SELECT signals depicted in FIG. 2 to aid in explaining the operation of the active pixel sensor 10. The RESET signal first makes a transition from LOW to HIGH as depicted by reference numeral 30 to turn on the N-channel MOS reset transistor 14 and thereby set the cathode of photodiode 12 to voltage Vref. The N-channel MOS transfer transistor 16 is then turned on when the TRANSFER signal makes a transition from LOW to HIGH as depicted by reference numeral 32. When the N-channel MOS reset transistor 14 is turned off as RESET signal makes a transition from HIGH to LOW as depicted at reference numeral 34, integration of photocurrent on photodiode 12 can begin.

While N-channel MOS transfer transistor 16 is turned on, the capacitance of the storage element 18 adds to the capacitance of the photodiode 12 during integration, thereby increasing the charge capacity and the range of the active pixel sensor 10. This also reduces variation in the pixel output due to capacitance fluctuations since gate oxide capacitance from which storage element 18 is formed is better controlled than junction capacitance of the photodiode 12. It should be appreciated by those of ordinary skill in the art that as photocharge is captured by the photodiode 12, the voltage level at storage node 22 decreases from the initial value of Vref at which it was set.

When the photocurrent integration period determined by external exposure control is complete, the N-channel MOS transfer transistor 16 turns off when the TRANSFER signal makes a transition from HIGH to LOW as indicated by reference numeral 36. The integration period is indicated by reference numeral 38. Turning off N-channel MOS transfer transistor 16 isolates the voltage level corresponding to the integrated photocharge onto the storage node 22. It is preferable to reset the photodiode 12 to Vref after the N-channel MOS transfer transistor 16 has been turned off by again turning on N-channel MOS reset transistor 14 as indicated by the RESET signal at reference numeral 40. This action will prevent the photodiode 12 from continuing to integrate during the read out process and possibly overflowing excess charge into the substrate which could affect the integrity of the signal on the storage node 22.

Immediately after the N-channel MOS transfer transistor 16 is turned off, the read out process can begin. Each of the active pixel sensors in a row is read when a ROW SELECT signal pulse depicted at reference numeral 42 is applied to the gate of the N-channel MOS row select transistor 24. In the readout operation of active pixel sensor 10, when N-channel row select transistor 24 is turned on, a voltage related to the voltage found on storage node 22 is placed on the column output line by N-Channel MOS readout transistor 22 acting as a source follower. The TRANSFER signal stays low until all of the rows have been read out or another cycle is initiated. When the readout operation begins, a HIGH signal applied to the COLUMN BIAS line grounds the column line.

To ensure adequate dynamic range in the image being captured by the active pixel sensor 10, the Vref must be a high enough voltage level so that when the cathode of the photodiode 12 is set to Vref, the voltage on the cathode of the photodiode 12 can accommodate the captured photocharge for the entire dynamic range of the image being sensed. When the voltage level Vref is not high enough, the brightest levels in the dynamic range corresponding to the highest levels of captured photocharge will not be properly sensed.

From the above discussion, it should be appreciated that the N-channel MOS reset transistor 14 places the voltage Vref at the cathode of the photodiode during a reset period, and the N-channel MOS transfer transistor 16 transfers photocharge captured by the photodiode 12 to the storage node 22 during an integration period, and then isolates the storage node 22 from further collection of photocharge by the cathode of photodiode 12 when the integration period has ended. During reset, the RESET line is preferably driven by a reset signal to a voltage at least a threshold above Vref to set the cathode of the photodiode 12 to Vref, and during the integration period, the TRANSFER line is preferably driven to a voltage that is at least one threshold above the voltage to which the cathode of photodiode 12 has been set at the beginning of the integration period.

It is presently understood by those of ordinary skill in the art that a nominal voltage level of 2.5 volts must be placed at the cathode of the photodiode 12 to adequately capture the photocharge corresponding to an acceptable dynamic range in images being sensed. Accordingly, a HIGH signal level for the RESET and TRANSFER signals to turn on the N-channel MOS reset and transfer transistors 14 and 16 must be at least one threshold voltage above Vref at approximately 4.0 volts. Unfortunately, due to reliability considerations, a voltage level of 4.0 volts exceeds the nominal operating voltage of 2.5 volts permitted in a 0.25 um process.

Further, when the N-channel MOS readout transistor 20 turns on during the readout period, the Vds of N-channel MOS readout transistor 20 is at its largest value during the entire operative cycle of the active pixel sensor 10, since the source of N-channel MOS readout transistor 20 is initially at ground during the readout period. If the voltage to be read out of the active pixel is a mid range grey value at about 1.25 volts (½ of the supply voltage in a 0.25 um process), then impact ionization current may likely be generated in N-channel MOS readout transistor 20.

In the event some of the electrons generated by the impact ionization current diffuse to the storage node 22, a read disturb will occur. The likelihood that electrons from the impact ionization current will diffuse to the storage node 22 is enhanced by the fact that in an active pixel sensor fabricated according to the present invention, the N-channel MOS transfer transistor 16 and the N-channel MOS readout transistor 20 are both disposed in the same P-well. This makes it relatively easy for an electron to diffuse the short distance from the N-channel MOS readout transistor 20 to the storage node 22 connected to the N-channel MOS transfer transistor 16.

Therefore, it is an object of the present invention to provide an active pixel sensor that operates with operating voltages that are greater than nominal operating voltage of a CMOS process by monitoring the electric fields in the active pixel sensor rather than the nominal operating voltages.

It is yet another object of the present invention to operate an active pixel sensor to avoid a read disturb due to impact ionization current generated in the readout transistor of the active pixel sensor.

BRIEF DESCRIPTION OF THE INVENTION

According to the present invention, an active pixel sensor is operated with voltages that exceed the nominal operating voltages for a particular integrated circuit process. The voltages that exceed the nominal operating voltages may be employed without violating reliability considerations by monitoring the electric fields in the active pixel sensors rather than simply the operating voltages.

In a second aspect of the present invention, the lower limit of the voltage representing the capture of photocharge in the active pixel sensor is fixed by setting the voltage applied to the gate of a reset transistor in the active pixel sensor to level during integration which prevents the voltage representing the capture of photocharge from dropping below a preselected value to control the electric field across the gate dielectric of a transfer transistor in the active pixel sensor.

In a third aspect of the present invention, the Vds in a readout transistor in the active pixel sensor is reduced at the beginning of the readout period by reducing the voltage applied to the drain of the readout transistor. Reducing the Vds effectively reduces read disturb at a storage node in the active pixel sensor by reducing the impact ionization current generated in the readout transistor of the active pixel sensor.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

According to the present invention, an active pixel sensor that it is fabricated with, for example, a 0.25 um CMOS process is coupled to operating voltages which are above the nominal operating voltage for the process technology to provide a useful dynamic range.

Figure 1:
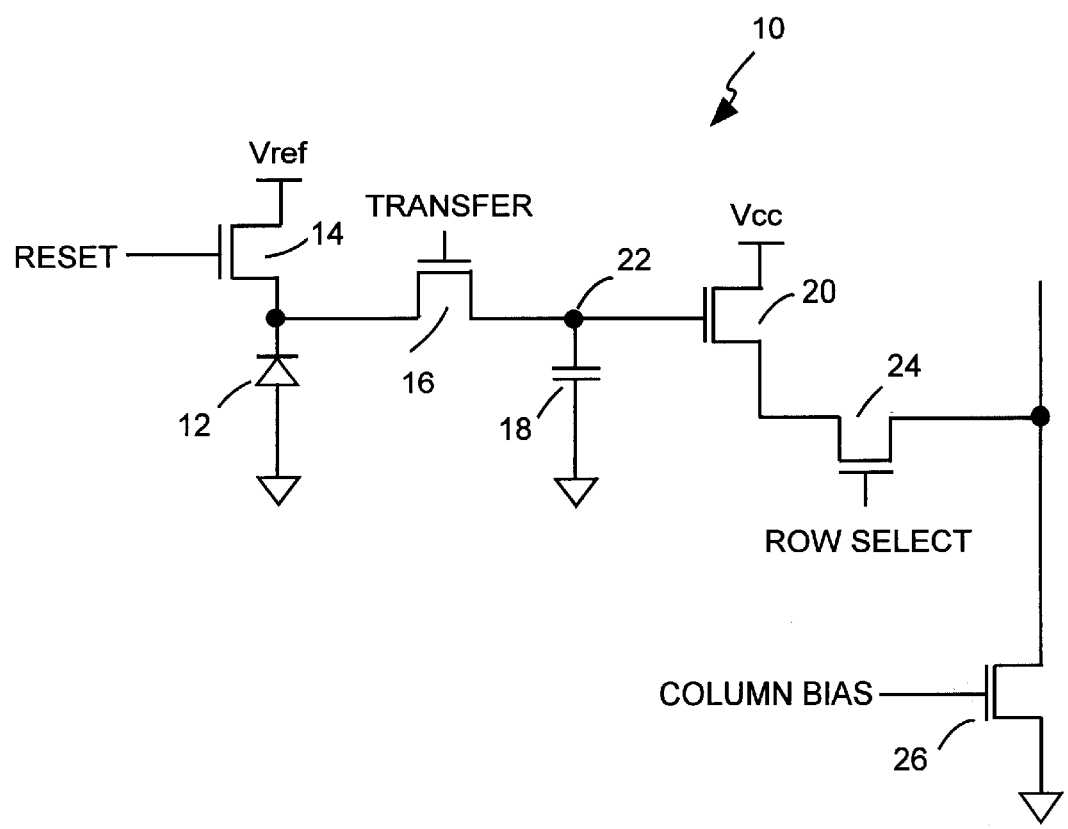
FIG. 1 is a schematic diagram of an active pixel operated at the nominal operating voltage of a 0.5 um process according to the prior art.
Figure 2:
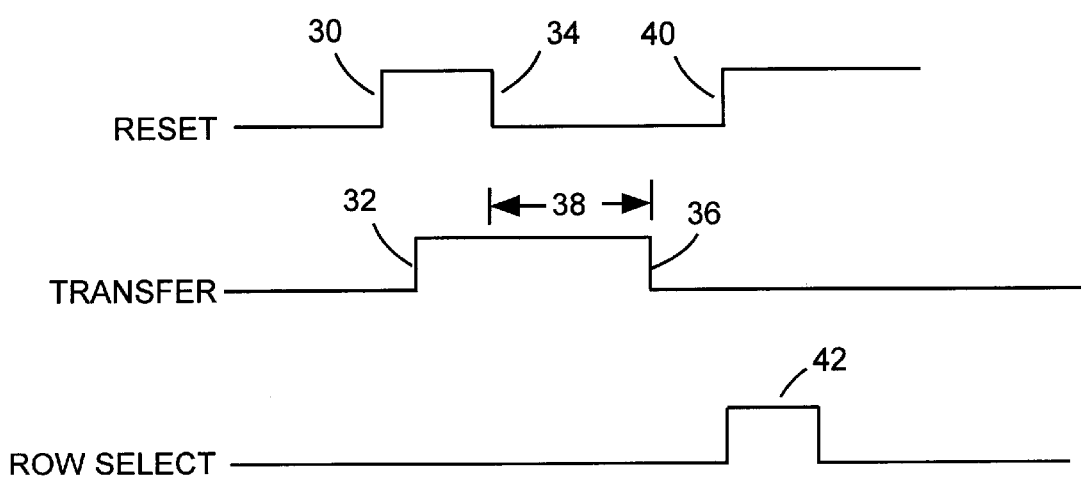
FIG. 2 is timing diagram of the RESET, TRANSFER, and READOUT signals employed in the operation of the active pixel sensor of FIG. 1.

In FIGS. 3A through 3D the nominal voltages at which an active pixel sensor 44 is operated according to the present invention are illustrated. The active pixel sensor 44 is similar to the active pixel sensor 10 depicted in FIG. 1, accordingly, in each of the FIGS. 3A through 3D, the elements therein employ the reference numerals depicted in FIG. 1 for the same elements. In the operation of the active pixel sensor 44, FIG. 3A corresponds to the reset period, FIGS. 3B and 3C correspond to the beginning and end of the integration period, respectively, and FIG. 3D corresponds to the readout period.

In FIGS. 3A–3D, it can be observed that according to the present invention, no voltage exceeding 2.5 volts is applied to any drain of the N-channel MOS transistors, so that the voltage across the pinch-off point cannot exceed the maximum for the process. Further, it should be appreciated that each of the voltages referred to herein are relative to the substrate or the anode of the photodiode. In the preferred embodiments these are both taken as ground. As such, for the voltages depicted in FIGS. 3A–3D, only voltages at the gates of the N-channel MOS transistors that are greater than the nominal operating voltage of 2.5 volts need to be monitored for an excessive electric field represented by a voltage greater than 2.75 volts across the gate dielectric. The worst case scenario for an excessive electric field is between the gate edge and the source or drain. Therefore in observing the voltages at the gates of the N-channel MOS transistors that are greater than the nominal operating voltage of 2.5 volts, only the voltages between the gates and the source or drain need be monitored for stress in the gate dielectric.

Figure 3A:
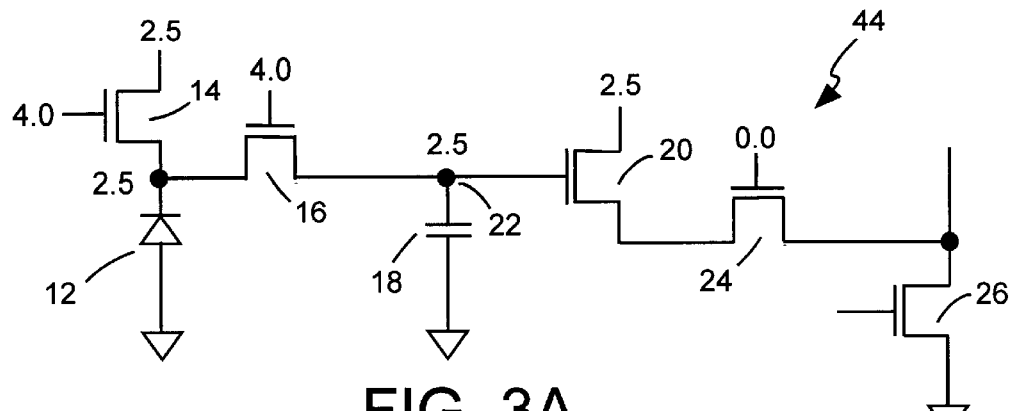
FIGS. 3A through 3D illustrate the voltages provided to an active pixel sensor during an operation cycle that includes the reset, integration and readout periods according to the present invention.

Turning now to FIG. 3A, in active pixel sensor 44, a HIGH signal of 4.0 volts has been applied to the gates of N-channel MOS reset and transfer transistors 14 and 16, respectively, to place the Vref voltage of 2.5 volts at the drain of the N-channel MOS reset transistor 14 on the cathode of photodiode 12 and to transfer the voltage level of 2.5 volts to the storage node 22. Preferably, the voltage Vref is in a range of about 2.0 volts to about 2.5 volts. The HIGH signal of 4.0 volts is required to ensure that the gate voltage is a threshold voltage Vth above the drain including the back gate bias. It will be appreciated by those of ordinary skill in the art that the back gate bias is determined by the voltage level at the source. In a 0.25 um process, for a minimum length transistor, the Vth corresponding to a back gate bias of 2.5 volts is 1.5 volts. The voltage at the drain of N-channel MOS readout transistor 20 is the Vcc of 2.5 volts. In this embodiment Vref and Vcc are tied together. In FIG. 3A, it can be observed that no voltage difference between a gate above the nominal operating voltage and a source or drain exceeds the maximum operating voltage of 2.75 volts.

Figure 3B:
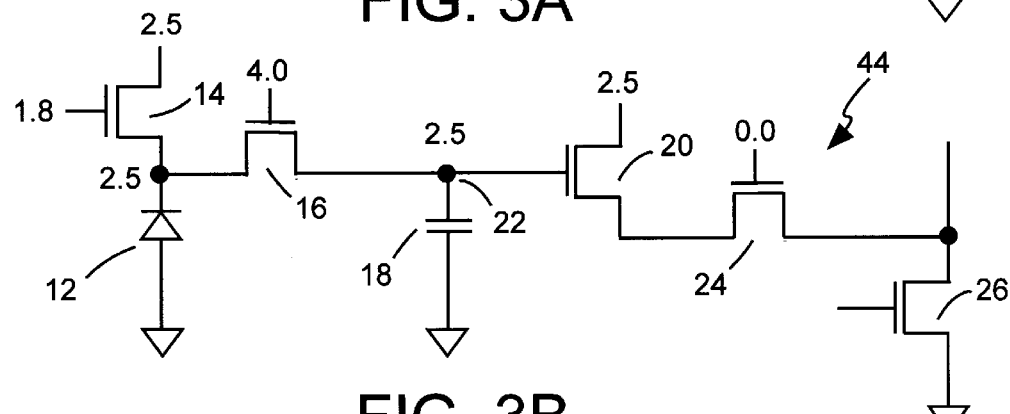
Figure 3C:
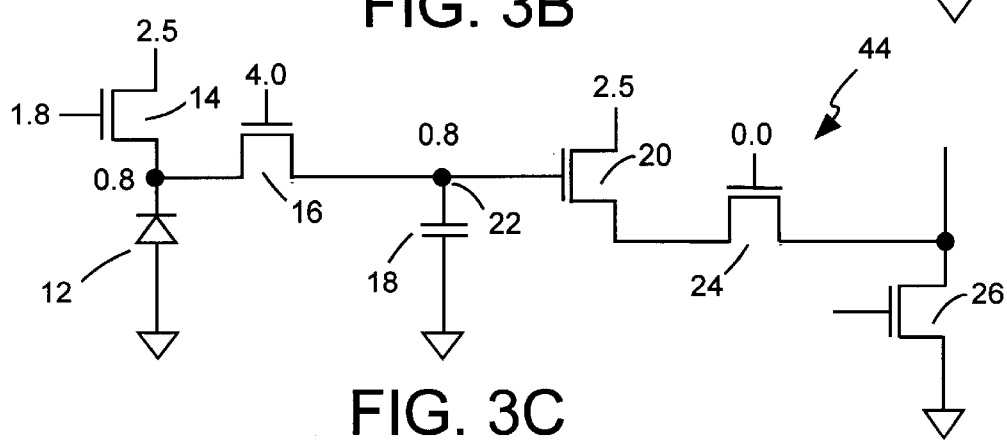

In FIG. 3B, the integration period begins by applying a LOW signal to the gate of N-channel MOS reset transistor 14 to turn off the N-channel MOS reset transistor 14. The LOW signal is 1.8 volts. Importantly, the LOW signal of 1.8 volts is chosen to set a lower limit on the voltage which the cathode of the photodiode 12 may achieve. The photodiode cathode lower limit of 0.8 volts represents the bright image case. This case is depicted in FIG. 3C. As previously explained, as the photodiode 12 captures charge, the voltage at the cathode of the photodiode 12 decreases. When the voltage level at the cathode of the photodiode 12 reaches 0.8 volts, N-channel MOS reset transistor 14 will conduct to limit the voltage at the cathode. The N-channel MOS reset transistor 14 conducts because the Vth for an N-channel MOS transistor in a 0.25 um process is typically about 1.0 volt for a back gate bias of 0.8 volts set by the voltage at the source.

During the integration period, it can be observed that in the bright pixel case, the voltage at the cathode of the photodiode 12 is 0.8 volts and the voltage at the gate of the N-channel MOS transfer transistor 16 is 4.0 volts. As a result there is a voltage of 3.2 volts across the gate oxide of the N-channel MOS transfer transistor 16. This exceeds the maximum operating voltage of 2.75 volts for a 0.25 um process by approximately fourteen percent. According to the present invention, it is believed that this nominally excessive voltage condition may be tolerated for at least several reasons.

First, the amount of time this condition will occur is only a small fraction of the total operating cycle time. In the bright image case, the active pixel sensors 44 will saturate to a bright condition for only a few milliseconds out of a total operating cycle time of approximately one second. Further, for an array of active pixel sensors forming an imager, the number of active pixel sensors 44 that will saturate to the bright pixel case is only a small percentage of the total number of active pixel sensors 44.

Second, the electric field constraints for a 0.25 um process were developed for a microprocessor type device contemplated as having $1\times10^{17}$ operating cycles in a lifetime. The total number of exposures of an imager array of active pixel sensors 44 in a still camera will not likely exceed $1\times10^{6}$.

Third, by performing an overvoltage prestress test during test operations, every active pixel sensor 44 in an imager array can be fully cycled and tested. An imager array with a sound dielectric layer will be able to withstand an overvoltage condition for as many cycles as are needed. An imager array with potentially weak gate dielectrics can be weeded out, and an imager with a few bad active pixel sensors 44 can probably be tolerated.

Figure 3D:
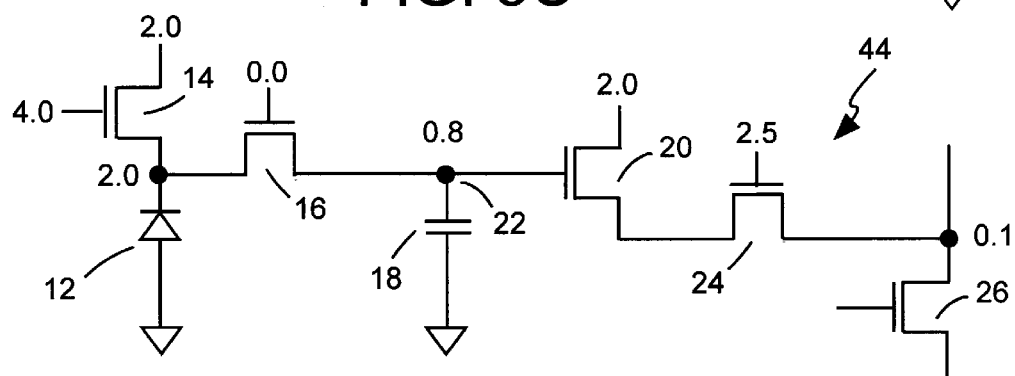

Turning now to FIG. 3D, as the readout period begins, a LOW voltage level of 0.0 volts is applied to the gate of the N-channel MOS transfer transistor 16 to turn it off, and the Vcc voltage (also Vref) at the drain of the N-channel MOS readout transistor 20 is lowered by 0.5 volts from 2.5 volts to 2.0 volts to reduce the read disturb condition caused by electrons from the impact ionization current diffusing to the storage node 22. After the readout period, the Vcc voltage (also Vref) will be raised again to 2.5 volts, so that when a HIGH voltage level of 4.0 volts is applied to the gate of the N-channel MOS reset transistor 14 to turn it on, a reset voltage of 2.5 volts will be placed on the cathode of the photodiode 12.

Figure 4:
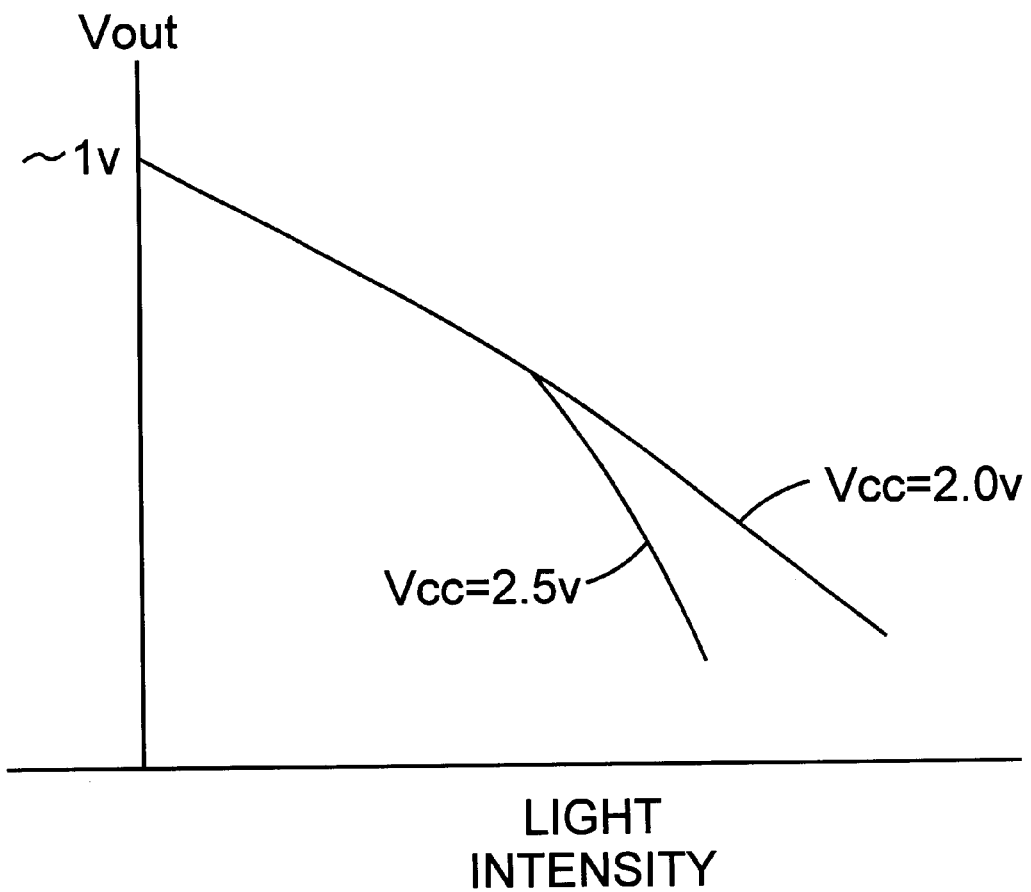
FIG. 4 illustrates the difference in grey scale linearity due to the reduction in impact ionization current according to the present invention.

As discussed above, the generation of the impact ionization current is due to the Vds voltage that develops in the N-channel MOS readout transistor 20 when the N-channel MOS row select transistor 22 is turned on at the beginning of the readout period, temporarily pulling the source of the N-channel MOS readout transistor 20 to near ground. The ground voltage was placed on the column output line when the N-channel MOS column bias transistor 26 was turned on at the end of the integration period. The slight reduction in the drain voltage of the N-channel MOS readout transistor 20 to reduce Vds results in a dramatic difference in grey scale linearity as illustrated by FIG. 4. The reduction in impact ionization current can be accounted for by the fact that the impact ionization current phenomena is an exponential function of Vds.

It should be appreciated that reducing the drain voltage of N-channel MOS readout transistor 20 does not affect the operation of N-channel MOS readout transistor 20 as a source follower, because Vds in the bright pixel or saturation condition will still be about 1.0 volt. A Vds of 1.0 volt is significantly greater than the Vgs–Vt overdrive, to thereby ensure that the saturation condition is met. Reducing the drain voltage of N-channel MOS readout transistor 20 at readout is preferable to simply reducing the supply voltage Vcc (also Vref) to 2.0 volts because that would have the unwanted effect of reducing the pixel output swing by a factor of two.

In an alternative embodiment, separate voltage supplies are employed for the N-channel MOS reset transistor 14 and the N-channel MOS readout transistor 20. In this embodiment, Vref coupled to the drain of the N-channel MOS reset transistor 14 remains fixed at 2.5 volts throughout the operating cycle of the active pixel sensor 44, and Vcc coupled to the drain of the N-channel MOS readout transistor 20 remains fixed at 2.0 volts throughout the operating cycle of the active pixel sensor 44.

It should be further appreciated, as disclosed in co-pending application Ser. No. 09/099,116, entitled "ACTIVE PIXEL SENSOR WITH BOOTSTRAP AMPLIFICATION", by Richard B. Merrill and Richard F. Lyon, filed on Jun. 17, 1998, now U.S. Pat. No. 6,097,022, and assigned to the same assignee as the present invention, and expressly incorporated herein by reference, the storage element 18 may be omitted and charge stored on the gate of N-channel MOS readout transistor 20 or that other capacitive means of charge storage may be employed.

In FIGS. 5A–5D the nominal voltages at which an active pixel sensor 46 employing bootstrap amplification is operated according to the present invention are illustrated. The active pixel sensor 46 is different from the active pixel sensor 44 depicted in FIGS. 3A–3D in that the charge storage element 18 has been removed. Further, the operating voltages for the active pixel sensor 46 in FIGS. 5A–5D, are also different from the operating voltages for the active pixel sensor 44 in FIGS. 3A–3D. In the operation of the active pixel sensor 48, FIG. 5A corresponds to the reset period, FIGS. 5B and 5C correspond to the beginning and end of the integration period, respectively, and FIG. 5D corresponds to the readout period.

Figure 5A:
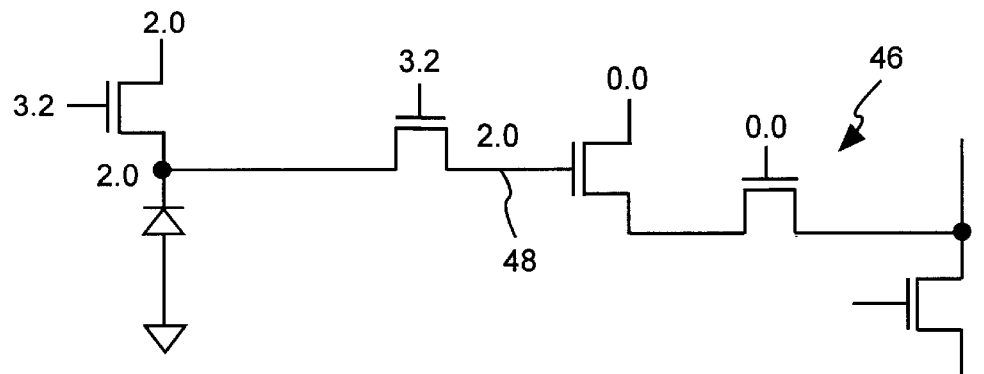
FIGS. 5A–5D illustrate the nominal voltages at which an active pixel sensor employing bootstrap amplification is operated according to the present invention.

Turning now to FIG. 5A, in active pixel sensor 46, a HIGH signal of 3.2 volts has been applied to the gates of N-channel MOS reset and transfer transistors 14 and 16, respectively, to place the Vref voltage of 2.0 volts at the drain of the N-channel MOS reset transistor 14 on the cathode of photodiode 12 and to transfer the voltage level of 2.5 volts to the storage node 48. Preferably, the voltage Vref is in a range of about 1.5 volts to about 2.0 volts. The HIGH signal of 3.2 volts is required to ensure that the gate voltage is a threshold voltage Vth above the drain including the back gate bias. The voltage at the drain of N-channel MOS readout transistor 20 is a Vcc of 0.0 volts.

Unlike the first embodiment disclosed above, Vref and Vcc are not tied together.

Figure 5B:
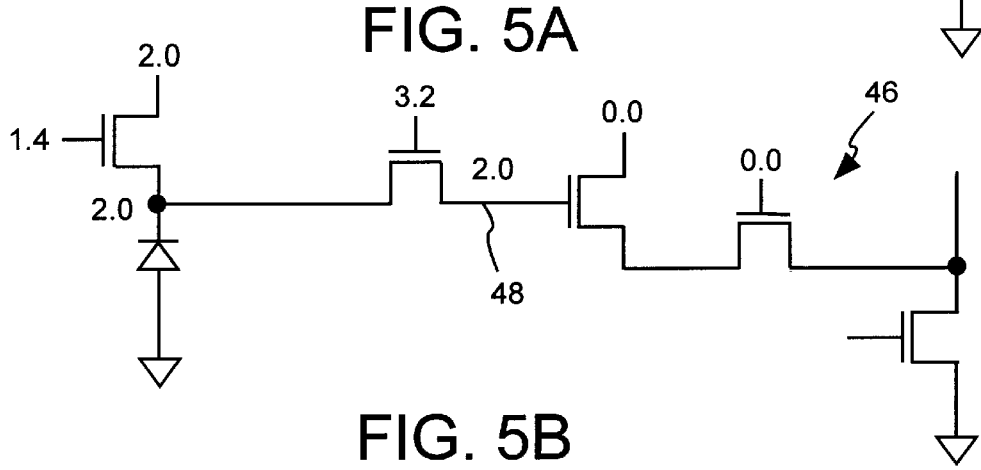
Figure 5C:
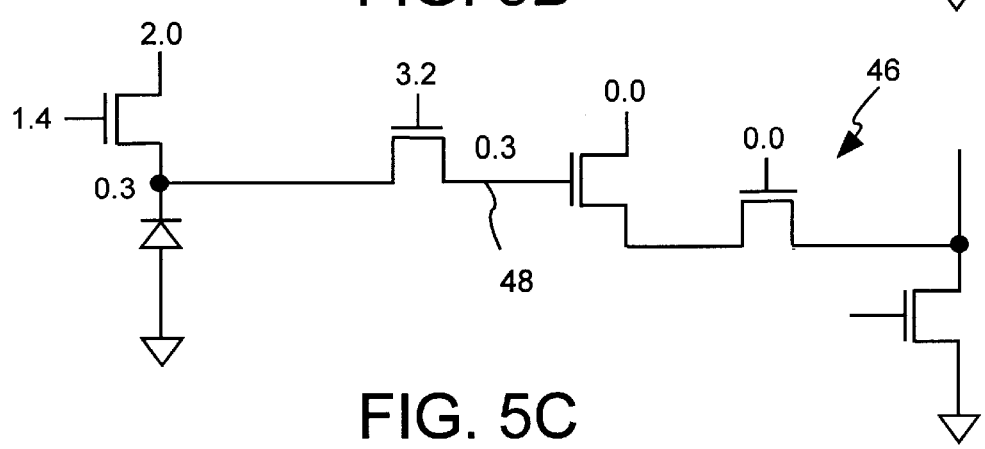

In FIG. 5B, the integration period begins by applying a LOW signal to the gate of N-channel MOS reset transistor 14 to turn off the N-channel MOS reset transistor 14. The LOW signal is 1.4 volts. Importantly, the LOW signal of 1.4 volts is chosen to set a lower limit on the voltage which the cathode of the photodiode 12 may achieve as explained above. In FIG. 5C, the photodiode cathode lower limit of 0.3 volts representing the bright image case is depicted.

Figure 5D:
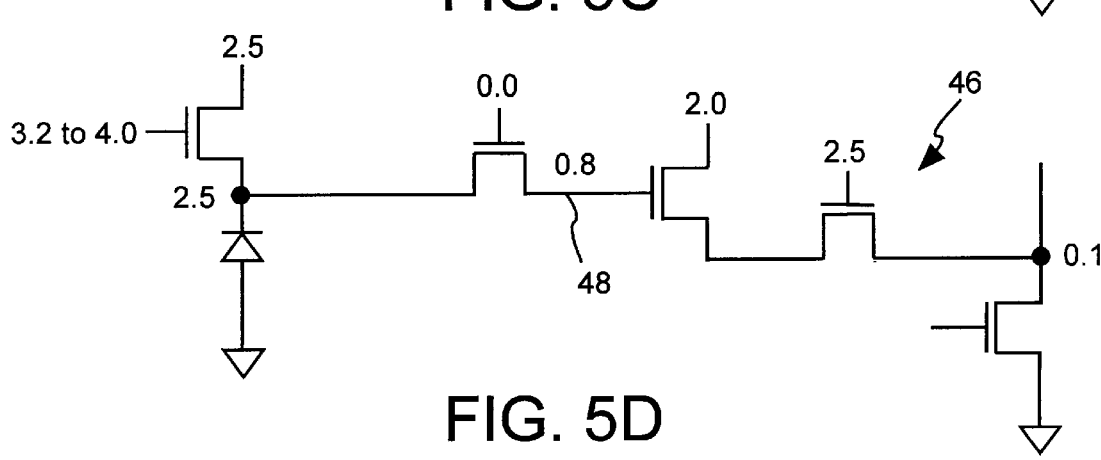

Turning now to FIG. 5D, as the readout period begins, a LOW voltage level of 0.0 volts is applied to the gate of the N-channel MOS transfer transistor 16 to turn it off, a HIGH voltage level in the range of about 3.2 to about 4.0 volts is applied to the gate of the N-channel MOS reset transistor 14 to turn it on, the voltage Vref at the drain of the N-channel MOS reset transistor 14 will be raised to 2.5 volts, and the Vcc voltage at the drain of the N-channel MOS readout transistor 20 is raised from 0.0 volts to 2.0 volts to employ bootstrap amplification while avoiding impact ionization current.

The voltage Vref at the drain of the N-channel MOS reset transistor 14 is raised to 2.5 volts, and an increased voltage level of up to 4.0 volts may applied to the gate of the N-channel MOS reset transistor 14 to deepen the depletion region on the cathode of photodiode 12 to prevent stray photo generated charge carriers from diffusing to the storage node 48. Since the cathode voltage is not employed as a reference potential during the readout interval, it is not necessary for the gate voltage to exceed the drain voltage by Vth. Alternatively, the voltage Vref at the drain of the N-channel MOS reset transistor 14 may be kept in the range of about 1.5 volts to about 2.0 volts, and the voltage level of 3.2 volts applied to the gate of the N-channel MOS reset transistor 14. Further, It should be appreciated that the drain of the N-channel MOS readout transistor 20 is not raised above 2.0 volts to reduce the read disturb condition caused by electrons from the impact ionization current diffusing to the storage node 48.

Figure 6:
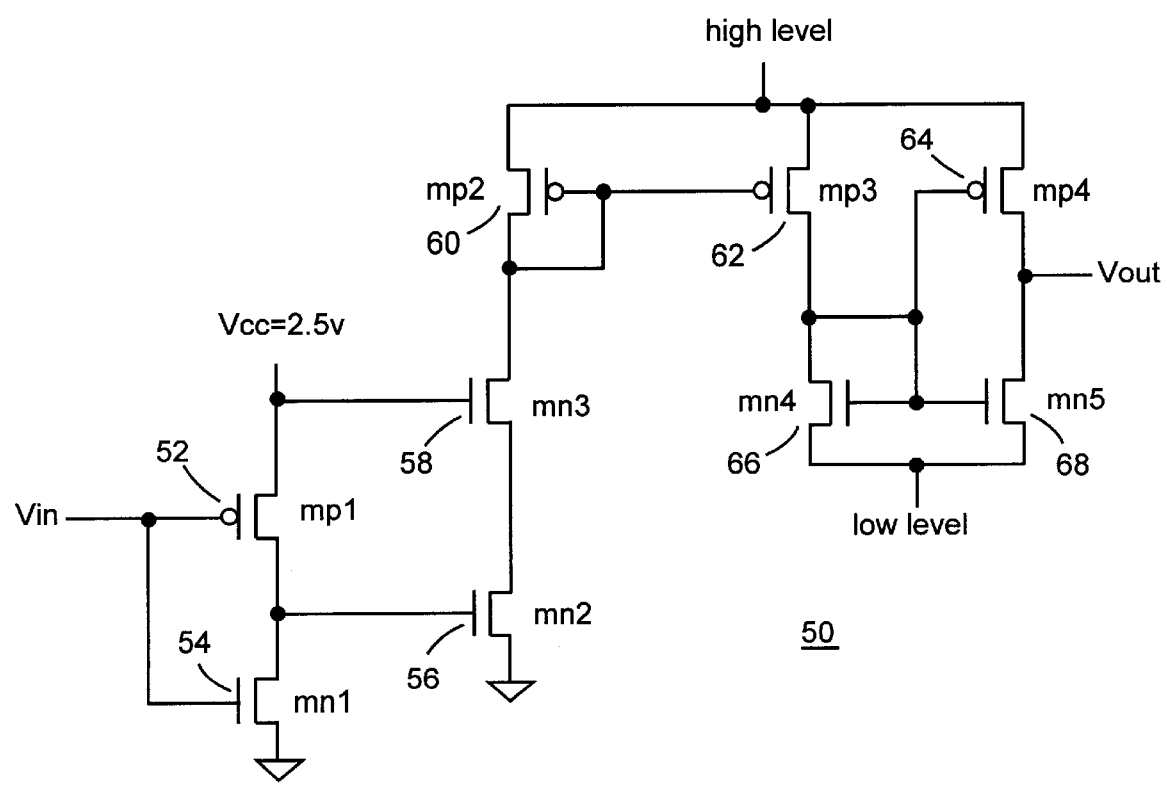
FIG. 6 is a schematic diagram of a level shifter for providing voltages above the nominal operating voltage in a 0.25 um process suitable for use according to the present invention.

In FIG. 6, a level shifter 50 is depicted that is suitable for providing the voltage level of 4.0 volts for the HIGH reset signal and 1.8 volts for the LOW reset signal, and also for providing the voltage level of 4.0 volts for the HIGH transfer signal and 0.0 volts for the LOW reset signal. It will be appreciated that a separate level shifter 50 will be required for both the reset and transfer signals.

In level shifter 50, the input, Vin, is connected to the gates of a CMOS inverter implemented by a P-channel MOS pullup transistor 52 having a source connected to a 2.5 volt Vcc, and an N-channel MOS pulldown transistor 54 having a source connected to ground. The drains of P-channel MOS pullup transistor 52 and N-channel MOS pulldown transistor 54 form a common inverter output that is connected to the gate of an N-channel MOS transistor 56 with a source connected to ground. The 2.5 volt Vcc is also connected to the gate of an N-channel MOS transistor 58.

The source of N-channel MOS transistor 58 is connected to the drain of N-channel MOS transistor 56, and the drain of N-channel MOS transistor 58 is also connected to the drain of a P-channel MOS diode connected transistor 60 that forms a current mirror with a P-channel MOS current mirror transistor 62. The sources of the P-channel MOS transistors 60 and 62 in the current mirror are both connected to a high voltage level employed to provide the HIGH voltage for the reset and transfer signals.

The high voltage level is also connected to the source of a P-channel MOS transistor 64 whose gate is connected to the drain of P-channel MOS current mirror transistor 62.

The drain of P-channel MOS current mirror transistor 62 is also connected to the drain of an N-channel MOS diode connected transistor 66 that forms a current mirror with an N-channel MOS current mirror transistor 68. The sources of the N-channel MOS transistors 66 and 66 in the current mirror are both connected to a low voltage level employed to provide the LOW voltage for the reset and transfer signals. The drains of the P-channel MOS transistor 64 and the N-channel MOS transistor 68 form a common connection to provide the output, Vout, of the level shifter 50.

The operation of the level shifter 50 should be well understood by those of ordinary skill in the art, and will not be described herein to avoid overcomplicating the disclosure and thereby obscuring the present invention. However, it should be noted that in the level shifter 50 there are no excess voltage excursions across the pinch-off point or voltage across a MOS transistor gate dielectric that exceeds the nominal voltage for the 0.25 um process.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for operating an active pixel sensor having a reset transistor, a transfer transistor, and a readout transistor fabricated according to a process having a nominal operating voltage comprising the steps of:

applying a voltage having a value greater than the nominal operating voltage to a gate of the reset transistor during a reset period to maximize the dynamic range of the active pixel sensor;

applying a voltage having a value greater than the nominal operating voltage to a gate of the transfer transistor during said reset period;

continuing to apply said voltage having a value greater than the nominal operating voltage to said gate of the transfer transistor during an integration period; and applying a voltage to said gate of the reset transistor during said integration period that limits an electric field applied across a gate dielectric of the transfer transistor during said integration period.

2. A method for operating an active pixel sensor as in claim 1, further including the steps of:

applying a first voltage level to a drain of said readout transistor during said reset period and integration period; and applying a second voltage level lower than said first voltage level to said drain of said readout transistor during a readout period to control the impact ionization current generated in said active pixel sensor during said readout period.

3. A method for operating an active pixel sensor as in claim 1, further including the steps of:

applying a first voltage level to a drain of said reset transistor; and applying a second voltage level lower than said first voltage level to said drain of said readout transistor to control the impact ionization current generated in said active pixel sensor.

4. A method for operating an active pixel sensor as in claim 1, further including the steps of:

applying a first voltage level to a drain of said reset transistor and a drain of said readout transistor during said reset period and said integration period; and applying a second voltage level lower than said first voltage level to said drain of said reset transistor and said drain of said readout transistor during a readout period to control the impact ionization current generated in said active pixel sensor during said readout period.

5. A method for operating an active pixel sensor as in claim 1, further including the steps of:

applying a first voltage level to a drain of said readout transistor during said reset period and integration period; and applying a second voltage level higher than said first voltage level to said drain of said readout transistor during a readout period, said second voltage level set to control the impact ionization current generated in said active pixel sensor during said readout period.

6. A method for operating an active pixel sensor as in claim 5, further including the steps of:

applying a third voltage level to a drain of said reset transistor during said reset period and integration period; and applying a fourth voltage level higher than said third voltage level to said drain of said reset transistor during a readout period, said fourth voltage level set to control photo generated charge during said readout period.

7. An active pixel sensor fabricated according to a process having a nominal operating voltage comprising:

a transfer transistor having a gate coupled to a voltage having a value greater than the nominal operating voltage during a reset period and an integration period in an operating cycle of said active pixel sensor; and a reset transistor having a gate coupled to a voltage having a value greater than the nominal operating voltage during a reset period in the operating cycle of said active pixel sensor to maximize the dynamic range of said active pixel sensor, and to a voltage that limits the electric field applied across a gate dielectric of said transfer transistor during said integration period in said operating cycle of said active pixel sensor.

8. An active pixel sensor as in claim 7 wherein a drain of said readout transistor is coupled to a first voltage level during said reset period and said integration period of said operating cycle of said active pixel sensor, and coupled to a second voltage level lower than said first voltage level during a readout period in said operating cycle of said active pixel sensor to control the impact ionization current in said active pixel sensor during said readout period.

9. An active pixel sensor as in claim 7 wherein a drain of said reset transistor is coupled to a first voltage level during said operating cycle of said active pixel sensor, and a drain of said readout transistor coupled to a second voltage level lower than said first voltage level during said operating cycle of said active pixel sensor to control the impact ionization current in said active pixel sensor.

10. An active pixel sensor as in claim 7 further including:

a reset transistor having a drain coupled to a first voltage level during said reset period and said integration period, and to a second voltage level lower than said first voltage level during a readout period; and a readout transistor having a drain coupled to said first voltage level during said reset period and said integration period, and said second voltage level lower than said first voltage level during a readout period to control the impact ionization current generated in said active pixel sensor during said readout period.

11. An active pixel sensor as in claim 7 wherein a drain of said readout transistor is coupled to a first voltage level during said reset period and said integration period of said operating cycle of said active pixel sensor, and coupled to a second voltage level higher than said first voltage level during a readout period in said operating cycle of said active pixel sensor, said second voltage level set to control the impact ionization current in said active pixel sensor during said readout period.

12. An active pixel sensor as in claim 10 wherein a drain of said reset transistor is coupled to a third voltage level during said reset period and said integration period of said operating cycle of said active pixel sensor, and coupled to a fourth voltage level higher than said third voltage level during a readout period in said operating cycle of said active pixel sensor, said fourth voltage level set to control photo generated charge during said readout period.

* * * * *